E. E. EWING.
BRAKE APPLIANCE.
APPLICATION FILED FEB. 21, 1917.
1,240,127.
Patented Sept. 11, 1917.
3 SHEETS—SHEET 1.
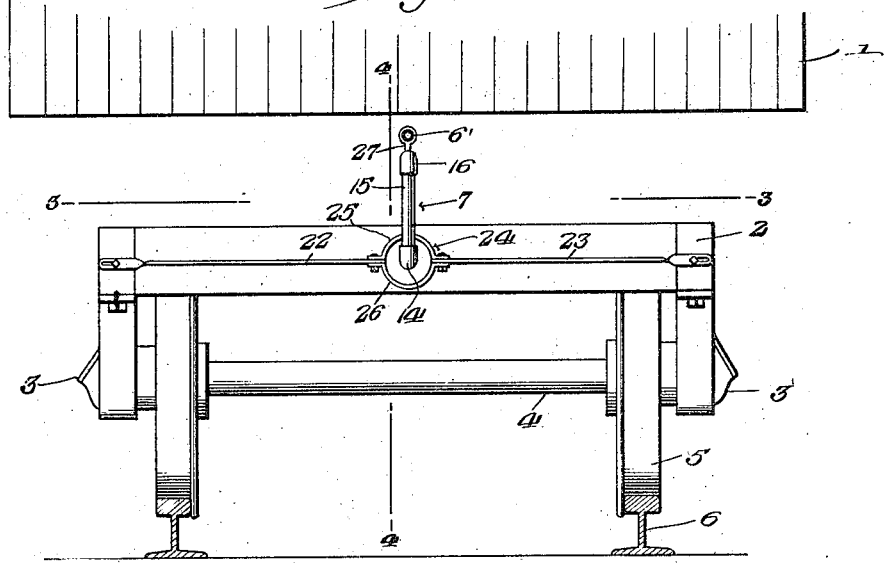
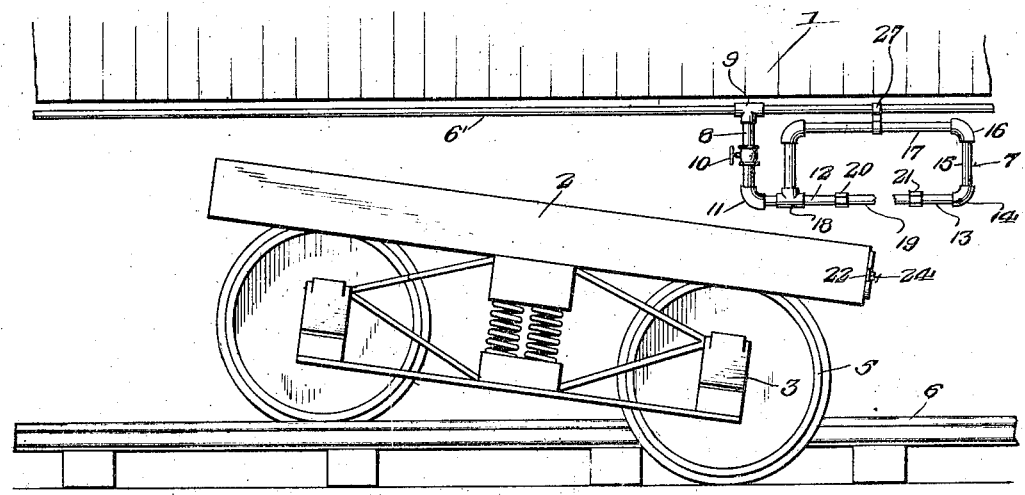
WITNESSES
INVENTOR
E. E. Ewing,
BY Victor J. Evans
ATTORNEY

E. E. EWING.
BRAKE APPLIANCE.
APPLICATION FILED FEB. 21, 1917.

1,240,127.

Patented Sept. 11, 1917.
3 SHEETS—SHEET 2.

Witnesses
J. H. Crawford

Inventor
E. E. Ewing,
By Victor J. Evans
Attorney

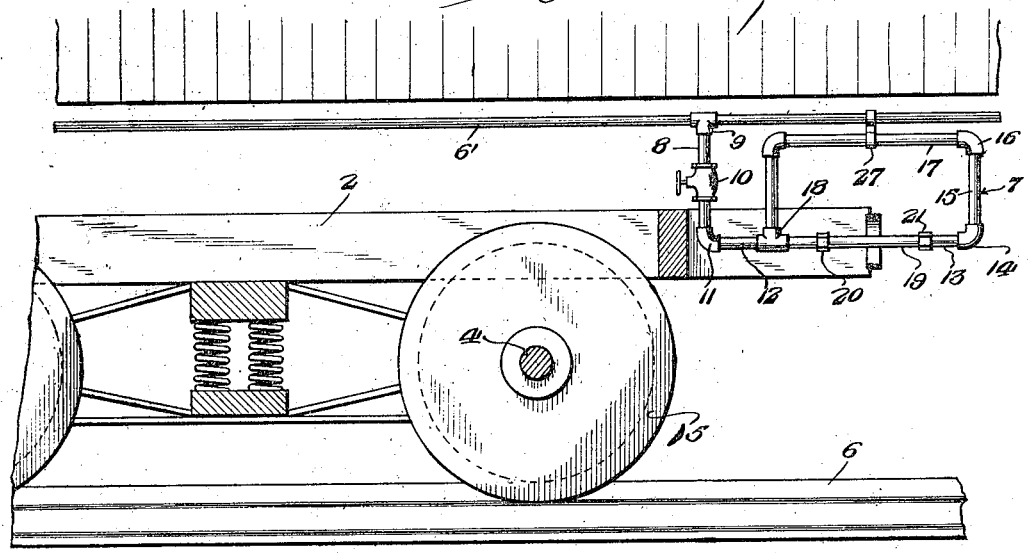
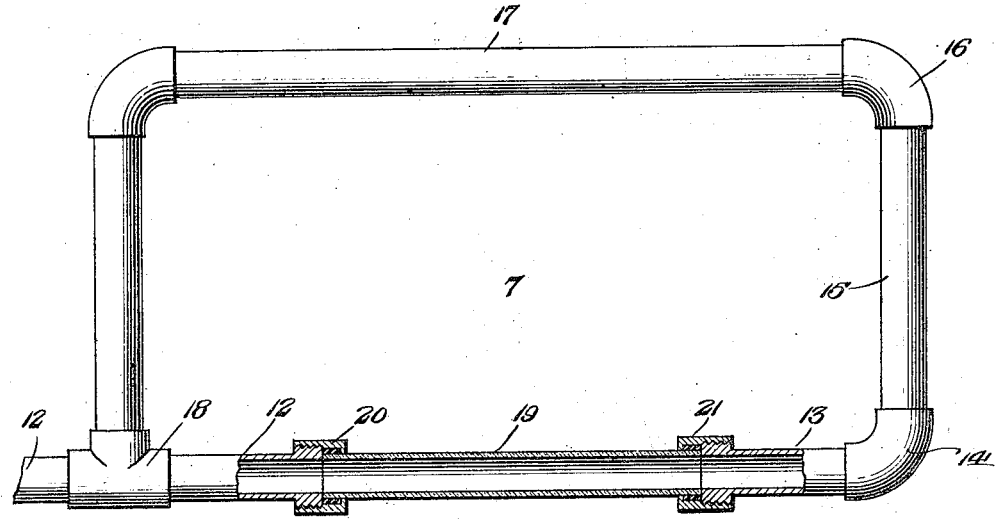

UNITED STATES PATENT OFFICE.

ERNEST E. EWING, OF SPOKANE, WASHINGTON.

BRAKE APPLIANCE.

1,240,127. Specification of Letters Patent. Patented Sept. 11, 1917.

Application filed February 21, 1917. Serial No. 150,127.

*To all whom it may concern:*

Be it known that I, ERNEST E. EWING, a citizen of the United States, residing at Spokane, in the county of Spokane and State of Washington, have invented new and useful Improvements in Brake Appliances, of which the following is a specification.

The present invention relates to improvements in means for applying the brakes to the wheels of a railway car, should the said wheels leave the rails of a track.

In carrying out my invention I aim to produce a device of this character which may be easily and quickly applied to the air pipe of an ordinary air brake system, and which will be operated to apply the brake by a simple mechanism secured to the truck for the wheels of the rolling stock provided with the said air brake system, said mechanism being so constructed and arranged as to be positively inoperative except when the wheels leave the rails and the truck is arranged at a decided angle to the car body, so that the brakes will be applied immediately during the action of derailment and before great injury can be inflicted to the passengers or to the rolling stock by the derailment.

It is also my purpose to arrange upon the main air pipe of a pneumatic brake system auxiliary branch pipes, certain of which including a breakable member which is suitably coupled thereto, while upon the longitudinal members of the truck frame I secure a bar, rod or the like which comprises two members and to the adjacent end of said members I secure an adjustable metal ring which is so positioned as to be just out of contact with the breakable member of the pneumatic system, so that the truck may be permitted a certain amount of vertical and lateral movement, due to an uneven roadbed, or to other causes, but which ring member will contact and break the said breakable member, when the truck is arranged at a decided angle to the car body, such, for instance, as when the wheels jump the track, thus permitting the escape of the fluid from the main air pipe and the consequent application of the brakes.

With the above and other objects in view, the improvement resides in the construction, combination and arrangement of parts set forth in the following specification and falling within the scope of the appended claim.

In the drawings:

Figure 1 is a front elevation of a car provided with my improvement,

Fig. 2 is a similar view illustrating the arrangement of parts when the wheels have jumped the track.

Fig. 4 is a vertical longitudinal sectional view approximately on the line 4—4 of Fig. 1, Fig. 5 is a greatly enlarged elevation, parts being in section, illustrating the manner of connecting the glass or breakable tube to the pipe members connected with the main air pipe.

Figure 3:
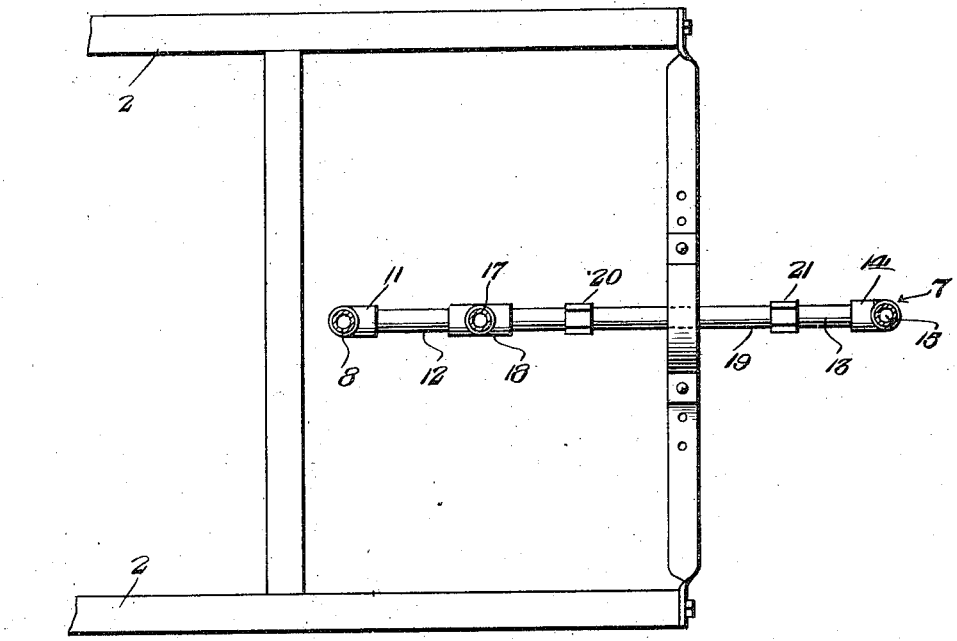
Fig. 3 is an enlarged horizontal sectional view approximately on the line 3—3 of Fig. 1.
Figure 6:
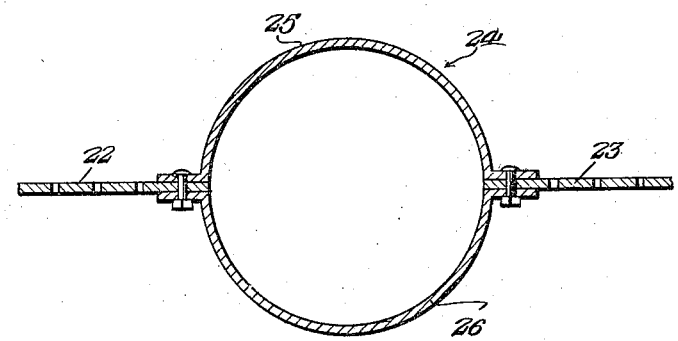
Fig. 6 is a sectional view through the ring member and the rods conected therewith.

Referring now to the drawings in detail, the numeral 1 designates the body of an ordinary railway car, 2 the wheel truck, 3 the bearings provided upon the truck which receive the extending ends of the axle 4, 5 the wheels upon the axle, and 6 the rails upon which the wheels travel. The truck frame 2 is connected to the body 1 through the medium of the usual central bearings and king pin, whereby the car is normally sustained in a horizontal position regardless of the movement of the truck and the wheels upon the truck.

Extending longitudinally below the frame of the car body 1 is the line or main air pipe 6' of the usual pneumatic brake system, the details of the brake construction, not entering the subject-matter of the present invention, have not been illustrated, and need not be referred to only to the extent that the bleeding of the pipe 6' will cause the brakes to be applied to the wheels of the rolling stock in the usual and ordinary manner.

Connected with the pipe 6' to the rear of its cock and air hose and above the truck 2 is a pipe system or coil which is indicated by the numeral 7. The coil is made up of a vertically depending pipe section 8 connected to the main pipe 6' by a T 9, the said pipe below the T being provided with a valve 10 and having its lower end bent angularly and longitudinally in a line with the pipe 6' or otherwise provided with an elbow 11 to which is secured a short longitudinally extending pipe 12, the said pipe 12 registering with a similar short pipe 13 which is connected by an elbow 14 with a vertically disposed pipe 15, the said pipe 15 having its upper end also provided with an elbow 16 to which is connected a longitudinally extending pipe 17 that is joined to the first mentioned pipe 7 through the medium of a T 18. The air from the pipe 6', it will thus be noted, will circulate through the pipes providing the member which I have termed the coil. The pipe sections 12 and 13 terminate a suitable distance away from each other and receive therein a glass tube 19. Suitable flanged couplings, or packing reducing members 20 and 21 are connected with the respective pipe members 12 and 13 and with the breakable tube 19 so that the tube is secured to the rectangular coil without danger of the fluid escaping through the joints thereof with the aforementioned pipe sections 12 and 13.

Connected with the longitudinal members of the truck frame 2 and arranged in longitudinal alinement are two rod members 22 and 23 respectively. Secured to each of said members is a ring 24, the same being received within the coil 7 and being arranged to have its upper portion above but normally out of contact with the glass tube 19. Preferably the ring 24 is made in two sections, 25 and 26 respectively, one adjustable upon the other and each sustained in said adjusted position through the medium of removable elements, such as screws or bolts. This arrangement is desirable, if not necessary, as the ring member is adapted to be adjusted longitudinally of the rods 22 and 23, the longitudinal adjustment being provided for by arranging the ring with laterally extending ears provided with a plurality of openings and the ends of the bars 22 and 23 are likewise provided with openings which register with the openings in the ears and securing elements in the nature of nuts and bolts pass through the said alining openings. Also I have found it desirable to provide the elbow 16 with a rod extension 27 which is also connected with the pipe 6'.

The operation of the device may be briefly described as follows: Should the wheels 5 leave the rails upon which the said wheels ride, the truck 2 will assume an angle with relation to the car 1, causing the ring or contact member 24 to engage with the tube 19, breaking the same and allowing the air to bleed from the coil 7, thus immediately applying the brakes and stopping the car before any great amount of damage can be inflicted either to the rolling stock or to the passengers of the car. When the car has been brought to a standstill, the valve 10 is operated to prevent a further escape of the fluid through the coil.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

In a device for the purpose set forth, the combination with a railway coach having an air brake system, of a coil connected with the main train line of the said system, said coil being made up of a plurality of connected pipe sections, one of which being fragile, a breakable element for the fragile section of the coil surrounding the said fragile member and being secured to the frame of the truck of the coach, and means for adjusting the said breaker member either in a vertical or longitudinal direction.

In testimony whereof I affix my signature.

ERNEST E. EWING.

Copies of this patent may be obtained for five cents each, by addressing the "Commissioner of Patents, Washington, D. C."